United States Patent
Chi et al.

(10) Patent No.: US 12,294,071 B2
(45) Date of Patent: May 6, 2025

(54) BATTERY PACK INCORPORATING BATTERY MODULE AND RIGID BEAM AND ADOPTING REVERSE ASSEMBLING

(71) Applicant: LG ENERGY SOLUTION, LTD., Seoul (KR)

(72) Inventors: Ho-June Chi, Daejeon (KR); Kyung-Mo Kim, Daejeon (KR); Jin-Yong Park, Daejeon (KR); Jhin-Ha Park, Daejeon (KR); Jung-Hoon Lee, Daejeon (KR); Hee-Jun Jin, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 646 days.

(21) Appl. No.: 17/630,049

(22) PCT Filed: Aug. 5, 2020

(86) PCT No.: PCT/KR2020/010350
§ 371 (c)(1),
(2) Date: Jan. 25, 2022

(87) PCT Pub. No.: WO2021/025469
PCT Pub. Date: Feb. 11, 2021

(65) Prior Publication Data
US 2022/0278389 A1 Sep. 1, 2022

(30) Foreign Application Priority Data
Aug. 7, 2019 (KR) .................. 10-2019-0096282

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ............ H01M 50/147; H01M 50/166; H01M 50/271; H01M 50/289; H01M 50/291;
(Continued)

(56) References Cited

U.S. PATENT DOCUMENTS 8,722,224 B2    5/2014  Lee et al.
2011/0250477 A1*  10/2011  Yoshida ............... B60L 3/0053
                                                           429/61
(Continued)

FOREIGN PATENT DOCUMENTS

CN    206558588 U    10/2017
CN    110071243 A    7/2019
(Continued)

OTHER PUBLICATIONS

International Search Report for PCT/KR2020/010350 mailed on Nov. 24, 2020.
(Continued)

*Primary Examiner* — Jeremiah R Smith
(74) *Attorney, Agent, or Firm* — Birch, Stewart, Kolasch & Birch, LLP

(57) ABSTRACT

Disclosed is a battery pack, which includes a plurality of battery modules and a pack case in which the battery modules are fixedly installed, the battery case includes a pack tray located at a lower portion of the battery modules, and a pack cover coupled with the pack tray to cover the battery modules, and each of the battery modules is fixedly coupled to the pack cover and includes battery cells arranged in one direction, a module case for accommodating the
(Continued)

battery cells in an inner space thereof, and a rigid beam disposed between the battery cells inside the module case.

13 Claims, 5 Drawing Sheets

(51) Int. Cl.
    *H01M 10/625*    (2014.01)
    *H01M 10/6568*   (2014.01)
    *H01M 50/147*    (2021.01)
    *H01M 50/264*    (2021.01)
    *H01M 50/271*    (2021.01)
    *H01M 50/291*    (2021.01)
    *H01M 50/505*    (2021.01)
    *H01M 50/293*    (2021.01)

(52) U.S. Cl.
    CPC ..... *H01M 10/6568* (2015.04); *H01M 50/147* (2021.01); *H01M 50/264* (2021.01); *H01M 50/271* (2021.01); *H01M 50/291* (2021.01); *H01M 50/505* (2021.01); *H01M 50/293* (2021.01); *H01M 2220/20* (2013.01)

(58) Field of Classification Search
    CPC ............. H01M 50/293; H01M 50/264; H01M 10/613; H01M 10/6568; H01M 10/6556; H01M 50/505
    See application file for complete search history.

(56) References Cited

U.S. PATENT DOCUMENTS

| | | | |
|---|---|---|---|
| 2015/0155533 A1* | 6/2015 | Kim | H01M 50/553 429/99 |
| 2015/0214569 A1 | 7/2015 | Kim et al. | |
| 2015/0287963 A1* | 10/2015 | Chiba | H01M 50/209 429/87 |
| 2017/0012330 A1 | 1/2017 | Kim et al. | |
| 2017/0309980 A1 | 10/2017 | Hong et al. | |
| 2017/0331079 A1 | 11/2017 | Yu et al. | |
| 2018/0034117 A1* | 2/2018 | Bang | H01M 10/6554 |
| 2019/0181405 A1 | 6/2019 | Kim et al. | |
| 2019/0267682 A1 | 8/2019 | Seo et al. | |
| 2019/0280278 A1* | 9/2019 | Morisaku | H01M 50/567 |
| 2019/0393567 A1 | 12/2019 | Ju et al. | |
| 2020/0067040 A1* | 2/2020 | Kim | H01M 50/211 |
| 2020/0212390 A1* | 7/2020 | Kume | H01M 10/6554 |
| 2020/0227714 A1* | 7/2020 | Motokawa | H01M 50/289 |
| 2020/0373638 A1* | 11/2020 | Lee | H01M 10/6572 |

FOREIGN PATENT DOCUMENTS

| | | |
|---|---|---|
| JP | 7-52659 A | 2/1995 |
| JP | 2013-101980 A | 5/2013 |
| JP | 2017-196858 A | 11/2017 |
| KR | 10-1218751 B1 | 1/2013 |
| KR | 10-2013-0073311 A | 7/2013 |
| KR | 10-2014-0024579 A | 3/2014 |
| KR | 10-2015-0134646 A | 12/2015 |
| KR | 10-2016-0111216 A | 9/2016 |
| KR | 10-1674991 B1 | 11/2016 |
| KR | 10-1803958 B1 | 12/2017 |
| KR | 10-2018-0035597 A | 4/2018 |
| KR | 10-2018-0091441 A | 8/2018 |
| KR | 10-2018-0112617 A | 10/2018 |
| KR | 10-2018-0113906 A | 10/2018 |
| KR | 10-2019-0001410 A | 1/2019 |
| KR | 10-2019-0069873 A | 6/2019 |
| WO | WO 2018/186566 A1 | 10/2018 |
| WO | WO 2018/186616 A1 | 10/2018 |

OTHER PUBLICATIONS

Extended European Search Report for European Application No. 20849740.4. dated Sep. 14, 2022.

* cited by examiner

BATTERY PACK INCORPORATING BATTERY MODULE AND RIGID BEAM AND ADOPTING REVERSE ASSEMBLING

TECHNICAL FIELD

The present disclosure relates to a battery pack, and more particularly, to a battery pack improved in mechanical rigidity and space utilization.

The present application claims priority to Korean Patent Application No. 10-2019-0096282 filed on Aug. 7, 2019 in the Republic of Korea, the disclosures of which are incorporated herein by reference.

BACKGROUND ART

A secondary battery refers to a battery that may be charged and discharged, unlike a primary battery that cannot be charged, and the secondary battery is used as a power source not only for small high-tech electronics such as a mobile phone, a PDA or a laptop computer but also for an energy storage system (ESS), an electric vehicle (EV) or a hybrid electric vehicle (HEV).

Currently widely used secondary batteries include lithium ion batteries, lithium polymer batteries, nickel cadmium batteries, nickel hydrogen batteries, nickel zinc batteries, and the like. An operating voltage of a unit secondary battery cell, namely a unit battery cell, is about 2.5V to 4.2V. Therefore, if higher output voltage and greater energy capacity are required, a plurality of battery cells are connected in series to configure a battery module, or two or more battery modules are connected in series or in parallel and other components are added to configure a battery pack. For example, the battery module may refer to a device in which a plurality of secondary batteries are connected in series or in parallel, and the battery pack may refer to a device in which battery modules are connected in series or in parallel to increase capacity and output.

In addition to the battery modules, the battery pack may further include a cooling device for properly maintaining the temperature of the battery modules, a control device for monitoring the operating state of the battery modules, and a pack case for packaging them.

Meanwhile, in the case of a battery pack for an electric vehicle, since the installation space of the battery pack is limited depending on the overall length and width of the electric vehicle, it is important to increase the energy density and sufficiently secure mechanical rigidity by mounting battery modules and other components inside the pack case as space-efficiently as possible.

However, in the conventional assembly structure of the battery pack, generally, as shown in FIG. 1, battery modules 2 are arranged between cross beams 3 on an upper surface of a pack tray 1 corresponding to a bottom surface of the pack case, and are fixed to the pack tray 1 by bolt fastening common. Here, the cross beam 3 refers to a structure formed integrally with or welded to the pack tray 1 to increase the rigidity of the pack case. The cross beam 3 is recently widely adopted in the pack case since it may act to prevent deformation such as distortion of the pack case when an external impact is applied thereto.

In general, each battery module 2 may fixed to the pack tray 1 by long bolts at four locations in total at front and rear corners, and a heatsink 4 for cooling is further disposed at the lower portion of each battery module 2. In addition, although not shown, inter-bus bars for electrically connecting the battery modules 2 to each other are attached to each battery module using bolts.

However, some problems have recently been pointed out with respect to the assembly structure of the conventional battery pack. Among them, two problems are frequently pointed out as follows: (i) the energy density of the battery pack decreases due to the occurrence of an unnecessary gap between the battery module and the cross beam and the space occupancy of the cross beams, and (ii) due to the fastening structure between the pack tray and a plurality of bolts used for fixing the battery module 2, the utilization of space below the pack case decreases (when a heatsink is installed below the battery module, the bolt fastening structure may be interfered and the cooling water input/output line may be complicated) and the assembling process is complicated.

Therefore, the development of a battery pack to which an assembly structure capable of solving the above problems is applied is becoming an issue.

DISCLOSURE

Technical Problem

The present disclosure is designed to solve the problems of the related art, and therefore the present disclosure is directed to providing a battery pack, which may improve energy density, mechanical rigidity, and space utilization for mounting a battery module and other components.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, which comprises a plurality of battery modules and a pack case in which the battery modules are fixedly installed, the pack case including a pack tray located at a lower portion of the plurality of battery modules, and a pack cover coupled with the pack tray covering the plurality of battery modules, and each of the plurality of battery modules is fixedly coupled to the pack cover and includes battery cells arranged in one direction, a module case for accommodating the battery cells in an inner space thereof, and a rigid beam disposed between the battery cells inside the module case.

The rigid beam of each of the plurality of battery modules are connected to the pack cover by a first fastening member that is fastened vertically to an outside of the pack cover.

Each rigid beam may be located in the middle of the respective battery cells and side surfaces of the rigid beam face surfaces of neighboring battery cells so as to block volume expansion of the battery cells.

The module case may include a base plate located at a lower portion of the battery cells to support the battery cells, and the base plate may have a flow path provided therein so that a coolant flows through the flow path.

The pack cover may include a cooling pipe embedded therein along an edge region of the pack cover, the base plate may include a cooling water port configured to communicate with the flow path of the base plate and formed to extend vertically, and the cooling water port may be directly connected to the cooling pipe in a vertical direction.

The pack cover may include an uneven portion fitted into an edge of the pack tray, and a cooling pipe mounting portion extending into the pack cover, the cooling pipe extending into the cooling pipe mounting portion.

Each of the plurality of battery modules may include electrode terminals protruding horizontally on a first side surface of the module case, the pack cover includes at least one terminal connection unit at an inner surface of the pack cover, and the electrode terminals of a first battery module among the plurality of battery modules and the electrode terminals of a second battery module among the plurality of battery modules may be electrically connected by the at least one terminal connection unit.

The at least one terminal connection unit may include: an insulating bracket fixedly coupled to the inner surface of the pack cover; and an inter-bus bar mounted to the insulating bracket and electrically connected to the respective electrode terminals.

The electrode terminals and the respective at least one terminal connection unit may be integrally connected by a second fastening member that is vertically inserted into the electrode terminals and the at least one terminal connection unit.

The module case may further include a terminal support configured to support a lower portion of the electrode terminals, and each of the plurality of battery modules may be fixed to the pack cover as the terminal support, the electrode terminals and the at least one terminal connection unit are integrally connected by the second fastening member.

The plurality of battery modules may be arranged in two rows such that electrode terminals thereof are disposed to face each other based on a center portion of the pack case.

In another aspect of the present disclosure, there is also provided a vehicle, comprising the battery pack described above. The vehicle may include an electric vehicle (EV) or a hybrid electric vehicle (HEV).

Advantageous Effects

According to an embodiment of the present disclosure, it is possible to provide a battery pack, which may improve energy density, mechanical rigidity, and space utilization for mounting a battery module and other components.

According to another embodiment of the present disclosure, the battery modules may be electrically connected and mechanical fixed simultaneously by utilizing the top cover.

According to still another embodiment of the present disclosure, by using the top cover and the base plate of the module case as a cooling water circulation space, it is possible to simplify the configuration of a cooling device and improve the installation space efficiency.

Other effects of the present disclosure may be understood by the following description and will be more clearly figured out by the embodiments of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
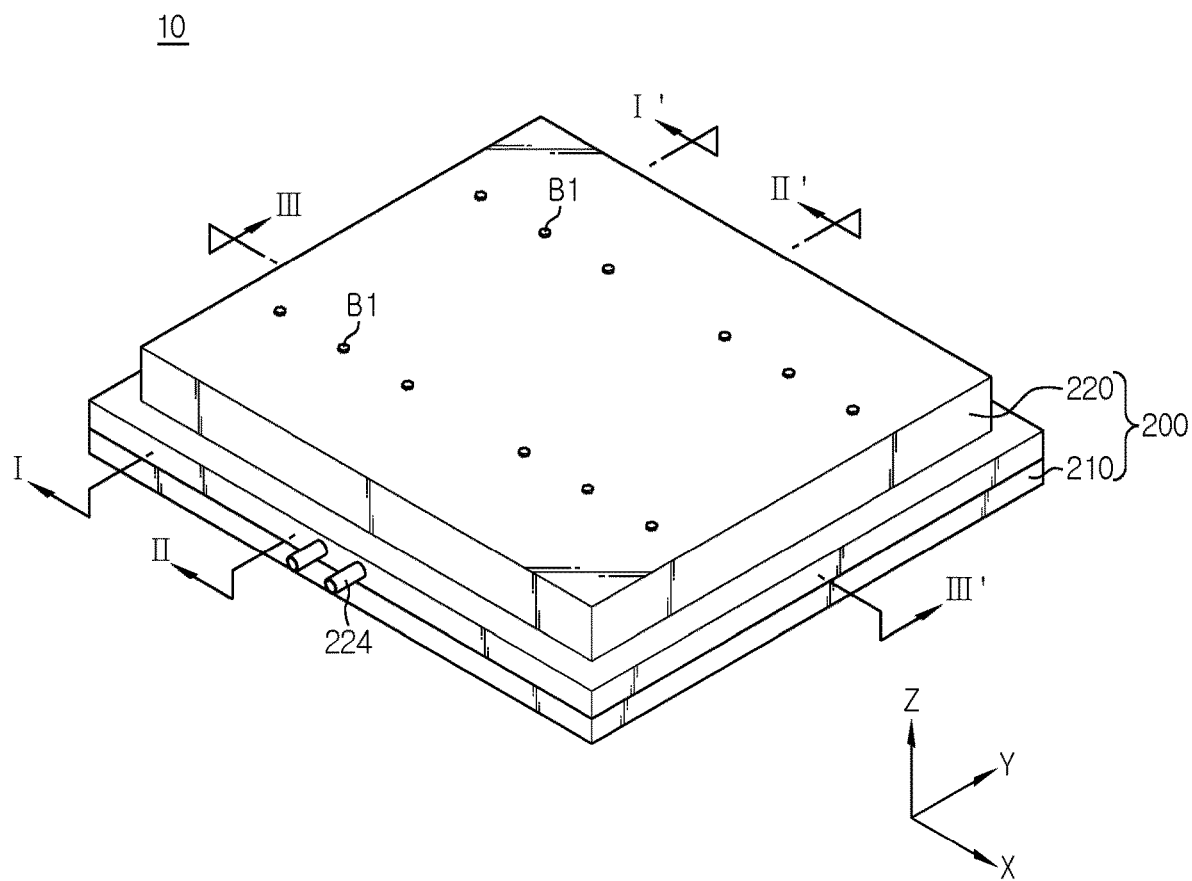
FIG. 2 is a perspective view schematically showing a battery pack according to an embodiment of the present disclosure.
Figure 3:
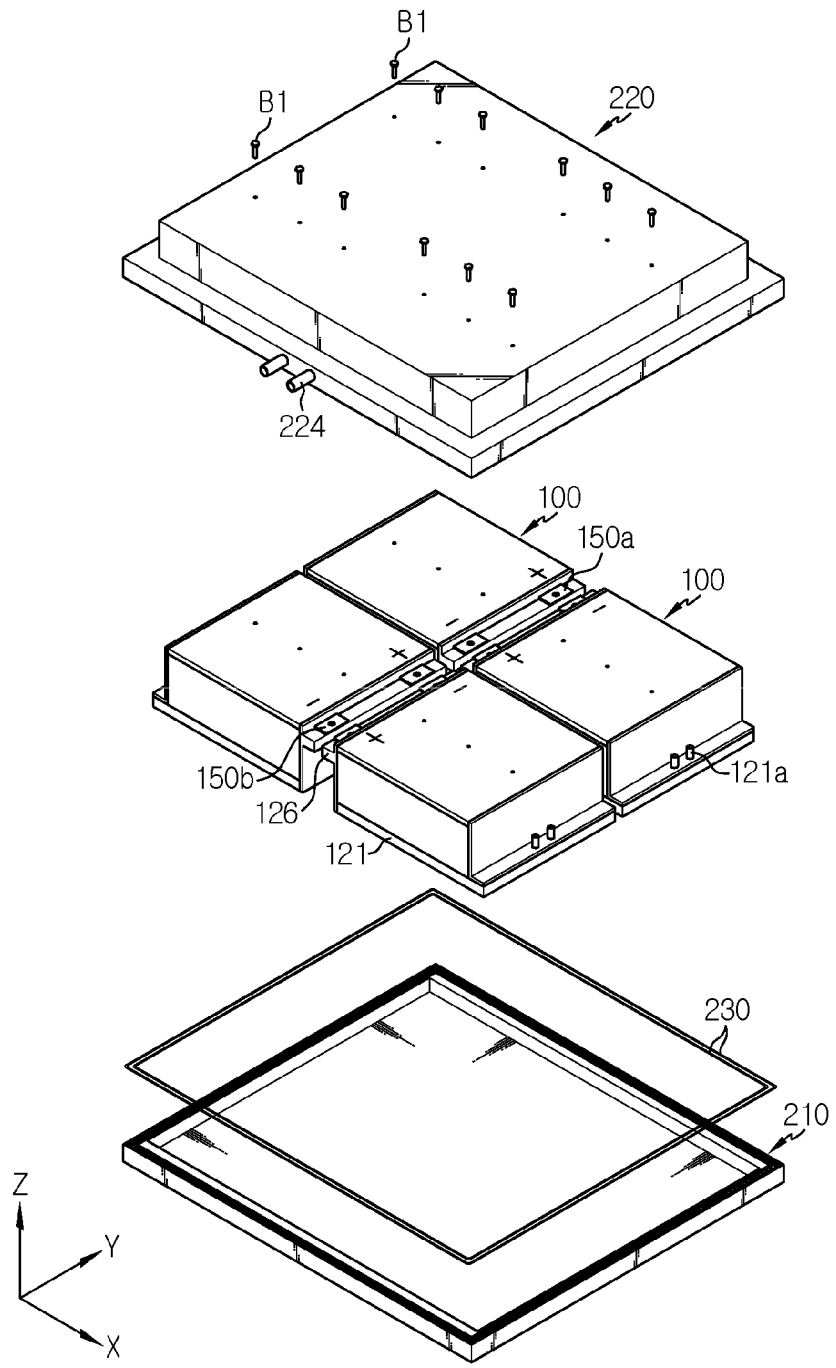
FIG. 3 is a partially exploded perspective view showing the battery pack of FIG. 2.
Figure 4:
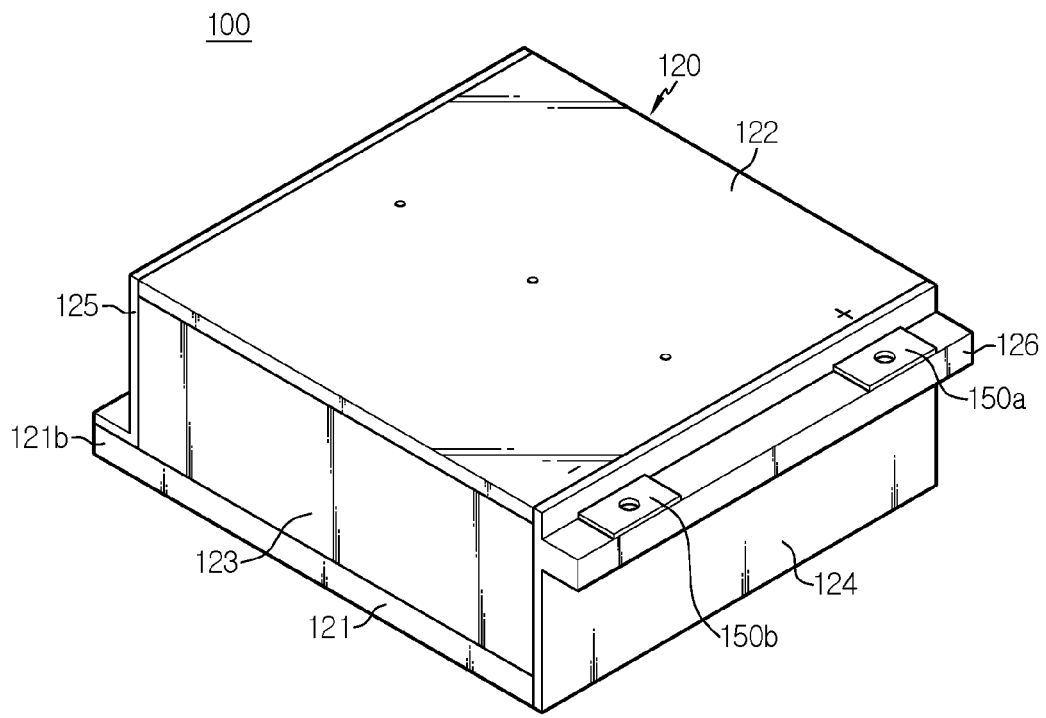
FIG. 4 is a perspective view schematically showing a battery module according to an embodiment of the present disclosure.

FIG. 2 is a perspective view schematically showing a battery pack according to an embodiment of the present disclosure, FIG. 3 is a partially exploded perspective view showing the battery pack of FIG. 2, and FIG. 4 is a perspective view schematically showing a battery module according to an embodiment of the present disclosure.

Referring to these drawings, a battery pack 10 according to an embodiment of the present disclosure includes a plurality of battery modules 100 and a pack case 200 for accommodating the battery modules 100. The pack case 200 includes a pack tray 210 for giving a space in which the plurality of battery modules 100 may be mounted, and a pack cover 220 coupled with the pack tray 210 to cover the entire battery modules 100.

Figure 1:
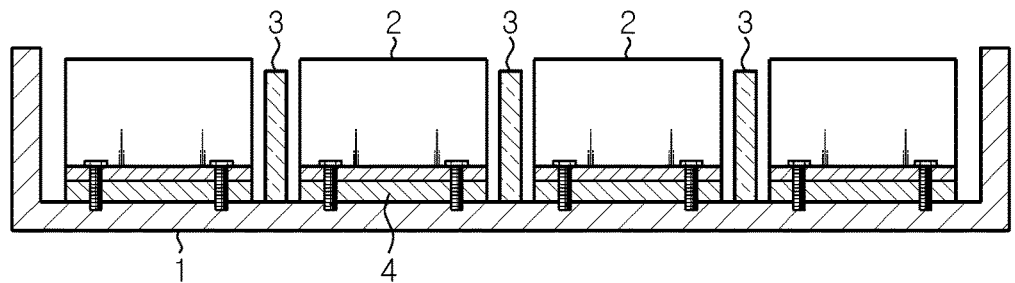
FIG. 1 is a diagram schematically showing an example in which a conventional battery pack is assembled.

As described later in detail, the battery pack 10 according to the present disclosure incorporates a beam frame (see FIG. 1) on the existing pack tray 210 into the battery modules 100 and also mechanically fixes and electrically connect the battery modules 100 to each other integrally with the pack cover 220, so there are advantages such as increased space utilization of the pack tray 210, simplified assembly process, and reduced number of fastening parts.

The battery module 100 included in the battery pack 10 will be described first. The battery module 100 includes battery cells 110, a module case 120 for accommodating the battery cells 110 in an inner space thereof, and electrode terminals 150a, 150b exposed out of the module case 120.

In this embodiment, the battery cells 110 may be pouch-type secondary battery cells. The pouch-type battery cells 110 may be arranged in one direction in a state of standing upright so that their broad surfaces face each other in the inner space of the module case 120. Although not shown in the drawings for convenience, each battery module 100 has a constant capacity and output voltage by connecting the battery cells 110 in series and/or in parallel. For reference, it is also possible that the battery cell 110 is replaced with a cylindrical secondary battery cell or a rectangular secondary battery cell.

As shown in FIG. 4, the module case 120 may include a base plate 121 and a top plate 122 for covering lower and upper portions of the battery cells 110, respectively, a pair of side plates 123 arranged at the outermost part of the battery cells 110 according to an arrangement direction thereof, and a front cover 124 and a rear cover 125 for covering front and rear sides of the battery cells 110, respectively.

In particular, the base plate 121, which forms a bottom surface of the module case 120, functions like a conventional heatsink. For example, a flow path through which a cooling water may flow is provided inside the base plate 121 so that the base plate 121 may directly cool the battery cells 110, and a cooling water port 121a is provided at an edge of the base plate to allow the cooling water to flow into and out of the flow path.

The cooling water port 121a may extend vertically from one side of the edge of the base plate 121 to be directly connected to a cooling pipe 224 of the pack cover 220, explained later. By means of the cooling water supplying and discharging structure, a cooling water may be supplied to the base plate 121 of each battery module 100.

A conventional battery pack 10 mostly has a cooling configuration in which a heat conduction pad and a heatsink are sequentially arranged under the battery module 100. However, in the present disclosure, the heatsink is incorporated to the base plate 121 of the module case 120, thereby reducing the heat transfer path, decreasing the number of parts, and saving the installation space of the cooling device, compared to the conventional art.

The front cover 124 and the rear cover 125 are located at the front of the battery cells 110 so that the electrode leads of the battery cells 110 or components such as an inter connection board (ICB) are not exposed to the outside.

The electrode terminals 150a, 150b include a positive electrode terminal 150a and a negative electrode terminal 150b, are located at an outer side of the top of the front cover 124 to have a rectangular plate shape so that its wide surface is placed horizontally so that bolts may be inserted therein in upper and lower directions.

The electrode terminals 150a, 150b may be placed on and supported by a terminal support 126. Here, the terminal support 126 is a part protruding from the front cover 124 and used as a place where a lower portion of the electrode terminals 150a, 150b is supported and a bolt of the battery module is fastened.

The terminal support 126 may be provided to extend along a width direction of the front cover 124, and in a place where the positive electrode terminal 150a and the negative electrode terminal 150b are located, one hole into which a bolt may be inserted may be formed.

Although not shown, a hole may also be provided such that a shoulder bolt is inserted in another place where the electrode terminals 150a, 150b are not located. In this way, the shoulder bolt may be fastened to the pack cover 220.

The pair of side plate 123 may serve to compress and support the battery cells 110 from the outside at the outermost battery cell 110 along the arrangement direction of the battery cells 110.

Figure 5:
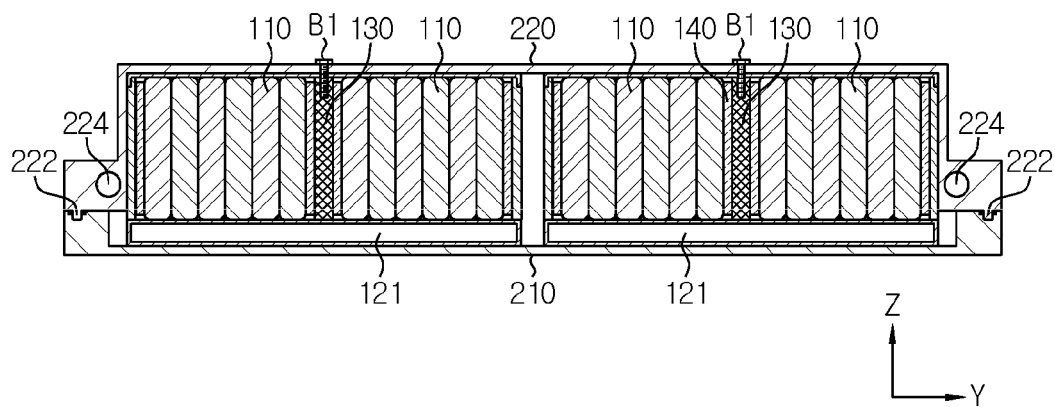
FIG. 5 is a sectional view, taken along the line I-I' of FIG. 2.

Meanwhile, as shown in FIG. 5, the battery module 100 of the present disclosure further includes a rigid beam 130 inside the module case 120. The rigid beam 130 is provided to have a predetermined thickness and an area corresponding to the wide surface of the battery cell 110, and may preferably be located in the middle of the battery cells 110 based on the arrangement order of the battery cells 110.

In the module case 120, the battery cells 110 are arranged such that the battery cells 110 are in close contact with both sides of the rigid beam 130. A group of battery cells 110 is located between the rigid beam 130 and one side plate 123, and another group of battery cells 110 is located between the rigid beam 130 and the other side plate 123. A buffer pad 140 may be further interposed between the battery cells 110 and the rigid beam 130.

The rigid beam 130 is disposed in the middle of the battery cells 110, and even if the battery cells 110 undergo volume expansion (swelling) during charging and discharging, the rigid beam 130 plays a role of absorbing the expansion pressure of the battery cells 110, so that the side plates 123 of the module case are less pressurized. Therefore, the rigid beam 130 may be effective in preventing the deformation of the module case 120.

In addition, top ends of the rigid beams 130 of the battery modules 100 may be integrally fastened by the pack cover 220 and a first fastening member B1 while the battery pack 10 is being assembled. Long bolts may be employed as the first fastening member B1, and the long bolts may be vertically fastened to the rigid beams 130 at the outside of the pack cover 220. As a result, the battery modules 100 may be fixed to the pack cover 220, and the pack cover 220 may also be supported by the rigid beams 130 to reinforce impact resistance.

Since the rigid beams 130 are incorporated into the battery module 100 as above, a problem caused by the beam frame, which is a structure for reinforcing the rigidity of the pack tray 210 as mentioned in the background art, namely the conventional problems such as the occurrence of an unnecessary gap between the battery module 100 and the cross beam and the decrease of energy density of the battery pack 10 caused by the space occupancy of the cross beams, may be solved.

Next, the electrical connection and fixing structure between the battery modules 100 inside the pack case 200 will be further described with reference to FIGS. 2, 3 and 6 to 8.

The battery modules 100 are arranged in two rows on the pack tray 210, and the electrode terminals 150a, 150b may be arranged to face each other based on the center of the pack case 200. In this embodiment, four battery modules 100 are provided in total, but the number of battery modules 100 may be increased or decreased. A positive electrode terminal of one battery module 100 may be connected to a negative electrode terminal of another neighboring battery module 100 by means of the terminal connection unit 221.

At least one terminal connection unit 221 may be provided at an inner surface of the top end of the pack cover 220. Specifically, the terminal connection unit 221 according to this embodiment includes an insulating bracket 221a fixedly coupled to the inner surface of the top end of the pack cover 220 and an inter-bus bar 221b made of a metal material, mounted to the bracket 221a and electrically connected with the electrode terminals 150a, 150b.

Figure 6:
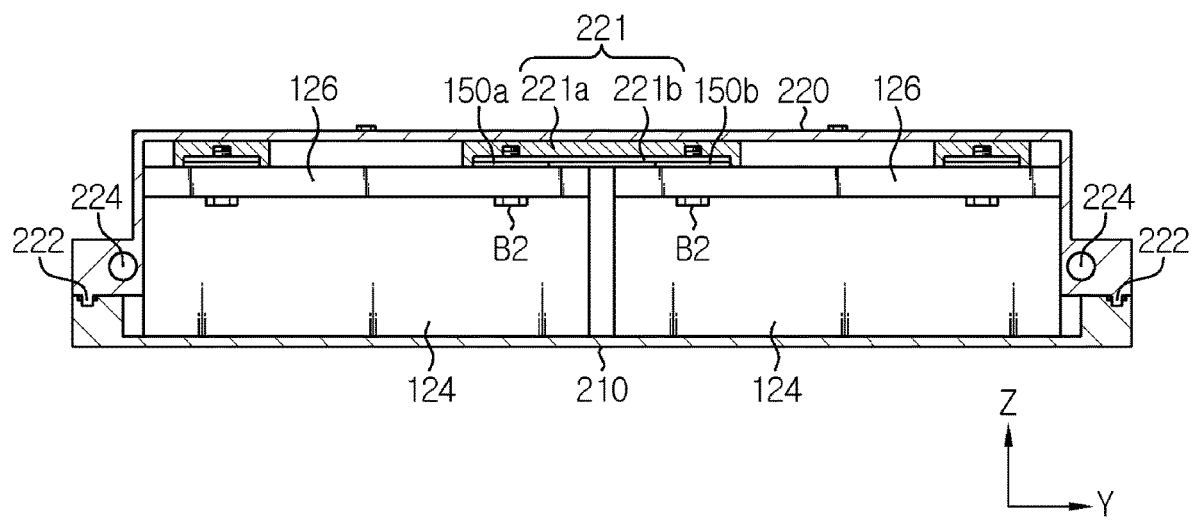
FIG. 6 is a sectional view, taken along the line II-IF of FIG. 2.

For example, as shown in FIG. 6, when the upper portion of the battery modules 100 is covered by the pack cover 220, positive electrode terminals and negative electrode terminals of two battery modules 100 adjacent in a Y-axis direction may be in contact with one end and the other end of the terminal connection unit 221 of the pack cover 220, respectively. In other words, as the positive electrode terminal of one battery module 100 and the negative electrode terminal of another battery module 100 come into contact with both ends of the inter-bus bar 221b of the terminal connection unit 221, both battery modules 100 may be connected in series. In addition, positive electrode terminals and negative electrode terminals of two battery modules 100 facing in an X-axis direction may also be connected in the same manner as above.

For the reliability of the electrical connection of the battery modules 100, the electrode terminals 150a, 150b and the terminal connection unit 221 may be integrally fastened to a second fastening member B2. The second fastening member B2 may be a bolt that is vertically inserted into the electrode terminals 150a, 150b and the terminal connection unit 221 to fasten them.

At this time, the bolt B2 is inserted at the lower portion of the terminal support 126 to fasten the electrode terminals 150a, 150b to the terminal support 126. Accordingly, it is possible to secure the electrical connection of the battery modules 100 and the fixation with the pack cover 220 at once, thereby reducing bolt fastening points and simplifying the assembly process. In addition, since the battery modules 100 are fixed to the pack cover 220, the bolt fastening space between the battery modules 100 and the pack tray 210 may be eliminated, so that the space utilization rate of the upper surface of the pack tray 210 may be improved.

In this embodiment, the battery modules 100 are arranged in two rows inside the pack case 200, but the present disclosure is not necessarily limited thereto. For example, the battery modules 100 may also be arranged in three or four or more rows. At this time, the battery modules 100 may be arranged in any way as long as the electrode terminals 150a, 150b of the battery modules 100 are arranged adjacent to each other and the electrode terminals 150a, 150b may be selectively connected by the terminal connection unit 221 when the upper portions of the battery modules 100 are covered with the pack cover 220.

Meanwhile, the pack cover 220 according to this embodiment may include a cooling pipe 224 embedded therein along an edge region thereof. The cooling pipe 224 may be directly connected to the cooling water port 121a provided to the base plate 121 of each battery module 100.

Figure 7:
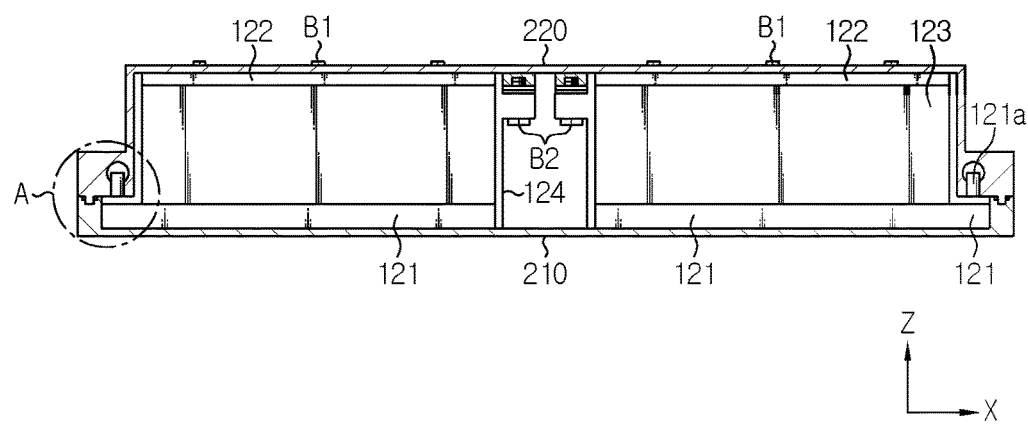
FIG. 7 is a sectional view, taken along the line of FIG. 2.
Figure 8:
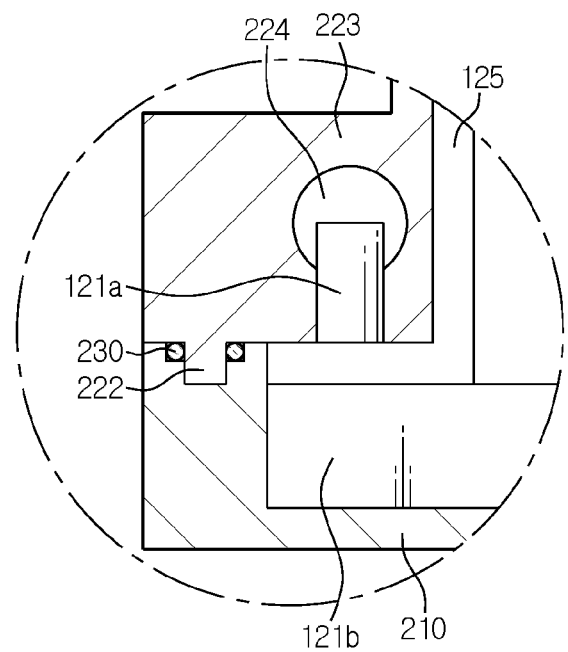
FIG. 8 is an enlarged view showing a region A of FIG. 7.

Specifically, as shown in FIGS. 7 and 8, the pack cover 220 includes an uneven portion 222 fitted into the edge of the pack tray 210 and a cooling pipe mounting portion 223 extending from the uneven portion 222 into the pack cover 220. An O-ring 230 made of rubber and configured to reinforce the sealing property may be further interposed at the bonding portion between the pack cover 220 and the pack tray 210.

The cooling pipe mounting portion 223 has an empty space provided to extend along a circumferential direction of the pack cover 220, and the cooling pipe 224 may be inserted into the empty space. As an alternative embodiment, in order to eliminate the inconvenience in inserting the cooling pipe 224 into the cooling pipe mounting portion 223, the cooling pipe 224 may be omitted by forming a region of the cooling pipe mounting portion 223 in a hollow structure.

The base plate 121 of each battery module 100 includes a port assembling portion 121b extending outward further based on a vertical surface of the rear cover. The cooling water port 121a may be provided upward in a vertical direction at the port assembling portion 121b.

The port assembling portion 121b is disposed directly below the cooling pipe mounting portion 223 of the pack cover 220, and the cooling water port 121a is directly connected to the cooling pipe 224 of the pack cover 220. Although not shown, a fixing connector and a sealing member may be further used to secure fastening and sealing properties between the cooling water port 121a and the cooling pipe 224.

According to this configuration of the present disclosure, the cooling water may be supplied to the base plate 121 of each battery module 100 while circulating in the circumferential direction of the pack cover 220 along the cooling pipe 224 of the pack cover 220, thereby absorbing the heat of the battery cells 110 during charging and discharging to maintain the battery cells 110 at an appropriate temperature.

In particular, in the present disclosure, since the cooling pipe 224 is included in the pack cover 220 and the cooling water port 121a of the base plate 121 is simply connected to the cooling pipe 224 by the shortest distance, the number of components such as additional connection pipes or hoses for circulating the cooling water may be reduced greatly. In addition, since there is no connection pipe or hose on the pack tray 210, the battery module 100 and other electronic components may be mounted more easily.

Figure 9:
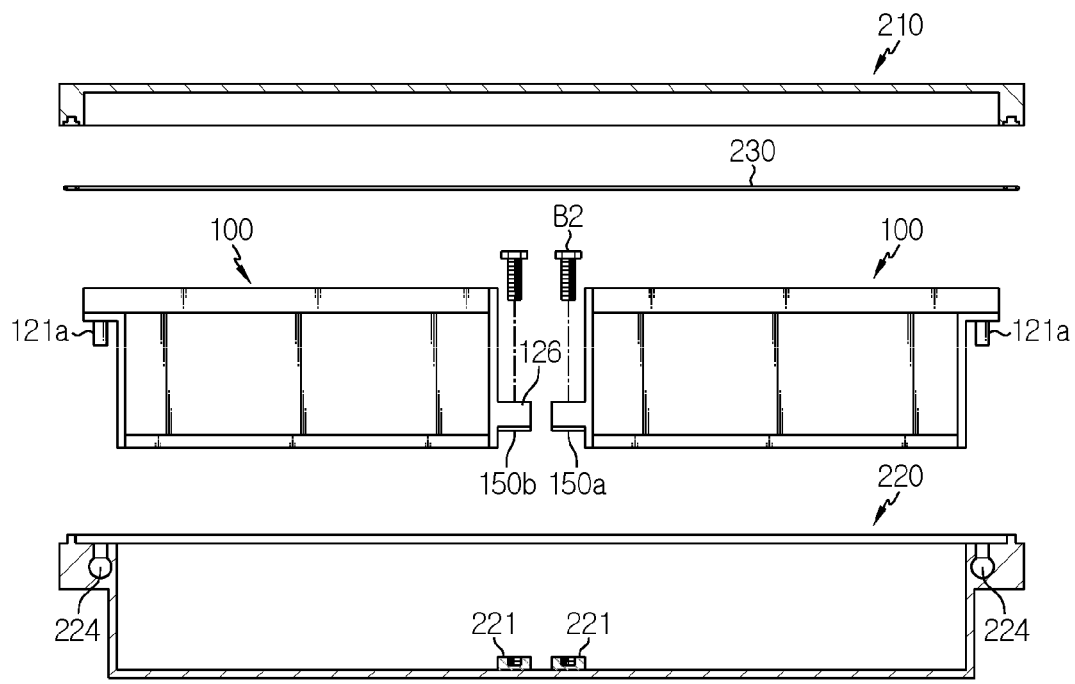
FIG. 9 is a reference view for illustrating an assembly order of the battery pack according to an embodiment of the present disclosure.

Next, an assembling example of the battery pack 10 according to an embodiment of the present disclosure will be briefly supplemented with reference to FIG. 9.

The battery pack 10 according to the present disclosure is assembled so that the battery modules 100 are fixed to the pack cover 220, unlike an assembling method of the conventional battery pack 10. In this respect, the battery pack 10 of the present disclosure may be said as a reverse module assembling type.

First, the pack cover 220 is turned over, and the battery modules 100 are disposed therein. At this time, the electrode terminals 150a, 150b of each battery module 100 are aligned with the corresponding terminal connection unit 221 of the pack cover 220 in an upper and lower direction, and the cooling water port 121a is prepared to be inserted into the cooling pipe 224 of the pack cover 220.

After that, by using the second fastening member B2, the terminal support 126 and the electrode terminals 150a, 150b of each battery module 100 and the terminal connection unit 221 of the pack cover 220 are integrally fastened to secure electrical connection and mechanical fixation of each battery module 100.

After that, the O-ring 230 is interposed in the uneven portion 222 of the pack cover 220, and then the edge portion of the pack tray 210 is coupled to the uneven portion 222 by fitting.

After that, the battery pack 10 is turned over again, and the rigid beams 130 of each battery module 100 and the pack cover 220 are integrally fastened using the first fastening member B1.

The battery pack 10 according to the present disclosure described above may further include various devices for controlling charging and discharging of the battery modules 100, such as a BMS, a current sensor and a fuse. The battery pack 10 may be applied not only to vehicles such as electric vehicles or hybrid electric vehicles. Of course, the battery pack 10 may be applied to energy storage systems or other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery pack, comprising:
a plurality of battery modules; and
a pack case in which the plurality of battery modules are fixedly installed, the pack case including:
a pack tray located at a lower portion of the plurality of battery modules; and
a pack cover coupled with the pack tray and covering the plurality of battery modules,
wherein each of the plurality of battery modules is fixedly coupled to the pack cover and includes:
battery cells arranged in one direction;
a module case for accommodating the battery cells in an inner space thereof; and
a rigid beam disposed between the battery cells inside the module case, and
wherein the rigid beam of each of the plurality of battery modules are connected to the pack cover by a first fastening member that is fastened vertically to an outside of the pack cover.

2. The battery pack according to claim 1,
wherein each rigid beam is located in the middle of the respective battery cells and side surfaces of the rigid beam face surfaces of neighboring battery cells so as to block volume expansion of the battery cells.

3. The battery pack according to claim 1,
wherein the module case includes a base plate located at a lower portion of the battery cells to support the battery cells, and
wherein the base plate has a flow path provided therein so that a coolant flows through the flow path.

4. The battery pack according to claim 3,
wherein the pack cover includes a cooling pipe embedded therein along an edge region of the pack cover,
wherein the base plate includes a cooling water port configured to communicate with the flow path of the base plate and formed to extend vertically, and
wherein the cooling water port is directly connected to the cooling pipe in a vertical direction.

5. The battery pack according to claim 4,
wherein the pack cover includes:
an uneven portion fitted into an edge of the pack tray; and
a cooling pipe mounting portion extending into the pack cover, the cooling pipe extending into the cooling pipe mounting portion.

6. The battery pack according to claim 1,
wherein each of the battery modules includes electrode terminals protruding horizontally on a first side surface of the module case,
wherein the pack cover includes at least one terminal connection unit at an inner surface of the pack cover, and
wherein the electrode terminals of a first battery module among the plurality of battery modules and the electrode terminals of a second battery module among the plurality of battery modules are electrically connected by the at least one terminal connection unit.

7. The battery pack according to claim 6,
wherein the at least one terminal connection unit includes:
an insulating bracket fixedly coupled to the inner surface of the pack cover; and
an inter-bus bar mounted to the insulating bracket and electrically connected to the respective electrode terminals.

8. The battery pack according to claim 6,
wherein the electrode terminals and the respective at least one terminal connection unit are integrally connected by a second fastening member that is vertically inserted into the electrode terminals and the at least one terminal connection unit.

9. The battery pack according to claim 8,
wherein the module case further includes a terminal support configured to support a lower portion of the electrode terminals,
wherein each of the plurality of battery modules-battery module is fixed to the pack cover, and
wherein the terminal support, the electrode terminal and the at least one terminal connection unit are integrally connected by the second fastening member.

10. The battery pack according to claim 1,
wherein the plurality of battery modules are arranged in two rows such that the electrode terminals thereof are disposed to face each other based on a center portion of the pack case.

11. A vehicle, comprising the battery pack according to claim 1.

12. A battery pack, comprising:
a plurality of battery modules; and
a pack case in which the plurality of battery modules are fixedly installed, the pack case including:
a pack tray located at a lower portion of the plurality of battery modules; and
a pack cover coupled with the pack tray and covering the plurality of battery modules,
wherein each of the plurality of battery modules is fixedly coupled to the pack cover and includes:
battery cells arranged in one direction;
a module case for accommodating the battery cells in an inner space thereof; and
a rigid beam disposed between the battery cells inside the module case,
wherein each of the battery modules includes electrode terminals protruding horizontally on a first side surface of the module case,
wherein the pack cover includes at least one terminal connection unit at an inner surface of the pack cover,
wherein the electrode terminals of a first battery module among the plurality of battery modules and the electrode terminals of a second battery module among the plurality of battery modules are electrically connected by the at least one terminal connection unit, and
wherein the at least one terminal connection unit includes:
an insulating bracket fixedly coupled to the inner surface of the pack cover; and
an inter-bus bar mounted to the insulating bracket and electrically connected to the respective electrode terminals.

13. A battery pack, comprising:
a plurality of battery modules; and
a pack case in which the plurality of battery modules are fixedly installed, the pack case including:
a pack tray located at a lower portion of the plurality of battery modules; and
a pack cover coupled with the pack tray and covering the plurality of battery modules,
wherein each of the plurality of battery modules is fixedly coupled to the pack cover and includes:
battery cells arranged in one direction;
a module case for accommodating the battery cells in an inner space thereof; and a rigid beam disposed between the battery cells inside the module case, wherein each of the battery modules includes electrode terminals protruding horizontally on a first side surface of the module case, wherein the pack cover includes at least one terminal connection unit at an inner surface of the pack cover, wherein the electrode terminals of a first battery module among the plurality of battery modules and the electrode terminals of a second battery module among the plurality of battery modules are electrically connected by the at least one terminal connection unit, wherein the electrode terminals and the respective at least one terminal connection unit are integrally connected by a second fastening member that is vertically inserted into the electrode terminals and the at least one terminal connection unit, wherein the module case further includes a terminal support configured to support a lower portion of the electrode terminals, wherein each of the plurality of battery modules is fixed to the pack cover, and wherein the terminal support, the electrode terminal and the at least one terminal connection unit are integrally connected by the second fastening member.

* * * * *